United States Patent
Sharma et al.

(10) Patent No.: US 12,417,053 B2
(45) Date of Patent: Sep. 16, 2025

(54) DATA STORAGE DEVICE AND METHOD FOR DELAYING EXECUTION OF A HOST WRITE COMMAND TO PERFORM AN INTERNAL MEMORY OPERATION

(71) Applicant: Sandisk Technologies, Inc., Milpitas, CA (US)

(72) Inventors: Amit Sharma, Bangalore (IN); Dinesh Kumar Agarwal, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 26 days.

(21) Appl. No.: 18/376,122

(22) Filed: Oct. 3, 2023

(65) Prior Publication Data

US 2025/0110666 A1    Apr. 3, 2025

(51) Int. Cl.
*G06F 3/06* (2006.01)
(52) U.S. Cl.
CPC .......... *G06F 3/0659* (2013.01); *G06F 3/0604* (2013.01); *G06F 3/064* (2013.01); *G06F 3/0679* (2013.01)
(58) Field of Classification Search
CPC ...... G06F 3/0659; G06F 3/0604; G06F 3/064; G06F 3/0679
See application file for complete search history.

(56) References Cited

U.S. PATENT DOCUMENTS

| | | | |
|---|---|---|---|
| 5,559,988 A | 9/1996 | Durante et al. | |
| 9,753,653 B2 | 9/2017 | Ellis et al. | |
| 9,778,878 B2 | 10/2017 | Hodgdon et al. | |
| 10,545,834 B1* | 1/2020 | Smith | G06F 3/067 |
| 11,494,122 B2 | 11/2022 | Tsai et al. | |
| 2010/0082879 A1 | 4/2010 | McKean et al. | |
| 2018/0183724 A1* | 6/2018 | Callard | H04L 41/0806 |
| 2019/0294371 A1* | 9/2019 | Lee | G06F 3/0679 |
| 2020/0304238 A1* | 9/2020 | Xiao | G06F 3/0679 |
| 2022/0245006 A1* | 8/2022 | Kommalapati | G16Y 40/20 |
| 2023/0176778 A1* | 6/2023 | Gohain | G06F 3/061 |

OTHER PUBLICATIONS

"Information technology—SCSI Architecture Model—5 (SAM-5)"; Working Draft American National Standard; Project T10/BSR INCITS 515; Revision 21; Jul. 22, 2015.
TPAR4144—Command Duration Limits (CDL); NVMe Technical Proposal Authorization Request; NVM Express; Aug. 9, 2022; 2 pages.

* cited by examiner

*Primary Examiner* — Masud K Khan
(74) *Attorney, Agent, or Firm* — Crowell & Moring LLP

(57) ABSTRACT

A data storage device and method for delaying execution of a host write command to perform an internal memory operation. In one embodiment, a data storage device is provided comprising a memory with single-level cell (SLC) blocks and multi-level cell (MLC) blocks, as well as a controller. The controller is configured to store, in a queue, a plurality of write commands received from a host, wherein each write command is associated with a timeout window; determine how long each of the plurality of write commands has been pending in the queue; and for each write command, delay execution of the write command within the write command's timeout window until the write command has been pending in the queue for a specified amount of time, wherein delaying execution of each write command provides the controller with time to perform a memory operation to increase an amount of available SLC blocks in the memory. Other embodiments are provided.

20 Claims, 9 Drawing Sheets

DATA STORAGE DEVICE AND METHOD FOR DELAYING EXECUTION OF A HOST WRITE COMMAND TO PERFORM AN INTERNAL MEMORY OPERATION

BACKGROUND

In some storage environments, a host sends write commands to a data storage device, and the data storage device stores the write commands in a queue. The data storage device can select write commands from the queue for execution at fixed intervals and prior to the expiration of a time-out window associated with the commands.

DETAILED DESCRIPTION

Figure 1A:
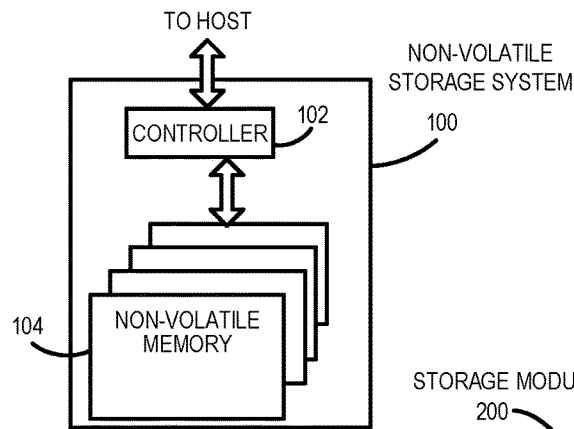
FIG. 1A is a block diagram of a data storage device of an embodiment.

The following embodiments generally relate to a data storage device and method for delaying execution of a host write command to perform an internal memory operation. In one embodiment, a data storage device is provided comprising a memory comprising single-level cell (SLC) blocks and multi-level cell (MLC) blocks, as well as a controller. The controller is configured to store, in a queue, a plurality of write commands received from a host, wherein each write command of the plurality of write commands is associated with a timeout window and execution of the plurality of write commands consumes available SLC blocks in the memory; determine how long each of the plurality of write commands has been pending in the queue; and for each write command of the plurality of write commands, delay execution of the write command within the write command's timeout window until the write command has been pending in the queue for a specified amount of time, wherein delaying execution of each write command of the plurality of write commands provides the controller with time to perform a memory operation to increase an amount of available SLC blocks in the memory.

In some embodiments, the controller is further configured to dynamically vary the specified amount of time based on a current amount of available SLC blocks in the memory.

In some embodiments, the controller is further configured to prioritize at least one write command of the plurality of write commands over another write command of the plurality of write commands based on a prioritization factor.

In some embodiments, the prioritization factor comprises a device type.

In some embodiments, the prioritization factor comprises a partition type.

In some embodiments, the prioritization factor comprises a queue type.

In some embodiments, the prioritization factor comprises a command type.

In some embodiments, the controller is further configured to use a timer to determine how long each write command of the plurality of write commands has been pending in the queue.

In some embodiments, the controller is further configured to determine how long each write command of the plurality of write commands has been pending in the queue by maintaining a counter of how many operations were issued within the data storage device since each write command of the plurality of write commands was received.

In some embodiments, the memory comprises a three-dimensional memory.

In another embodiment, a method is provided that is performed in a data storage device comprising a memory. The method comprises: storing, in a queue, a plurality of write commands received from a host, wherein each write command of the plurality of write commands is associated with a duration limit; determining how long each of the plurality of write commands has been pending in the queue; and for each write command of the plurality of write commands, delaying execution of the write command within the write command's duration limit until the write command has been pending in the queue for a threshold amount of time.

In some embodiments, the method further comprises dynamically changing the threshold amount of time based on an available amount of single-level cell (SLC) blocks in the memory.

In some embodiments, the method further comprises prioritizing at least one write command of the plurality of write commands over another write command of the plurality of write commands based on a prioritization factor.

In some embodiments, the prioritization factor comprises a device type.

In some embodiments, the prioritization factor comprises a partition type.

In some embodiments, the prioritization factor comprises a queue type.

In some embodiments, the prioritization factor comprises a command type.

In some embodiments, the method further comprises using a timer to determine how long each write command of the plurality of write commands has been pending in the queue.

In some embodiments, the method further comprises determining how long each write command of the plurality of write commands has been pending in the queue by maintaining a counter of how many operations were issued within the data storage device since each write command of the plurality of write commands was received.

In another embodiment, a data storage device is provided comprising: a memory; means for storing, in a queue, a plurality of write commands received from a host, wherein each write command of the plurality of write commands is associated with a timeout window; and means for delaying execution of each write command of the plurality of write commands within the write command's timeout window until the write command has been pending in the queue for a specified amount of time.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
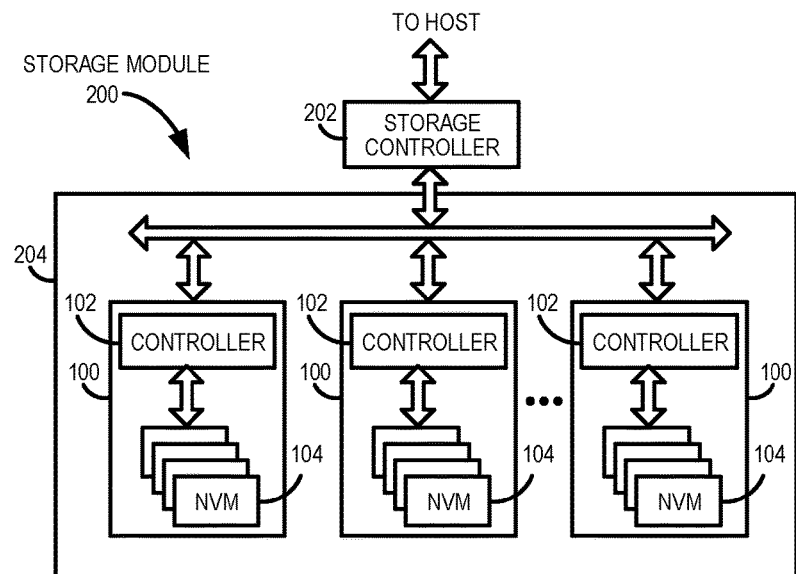
FIG. 1B is a block diagram illustrating a storage module of an embodiment.
Figure 1C:
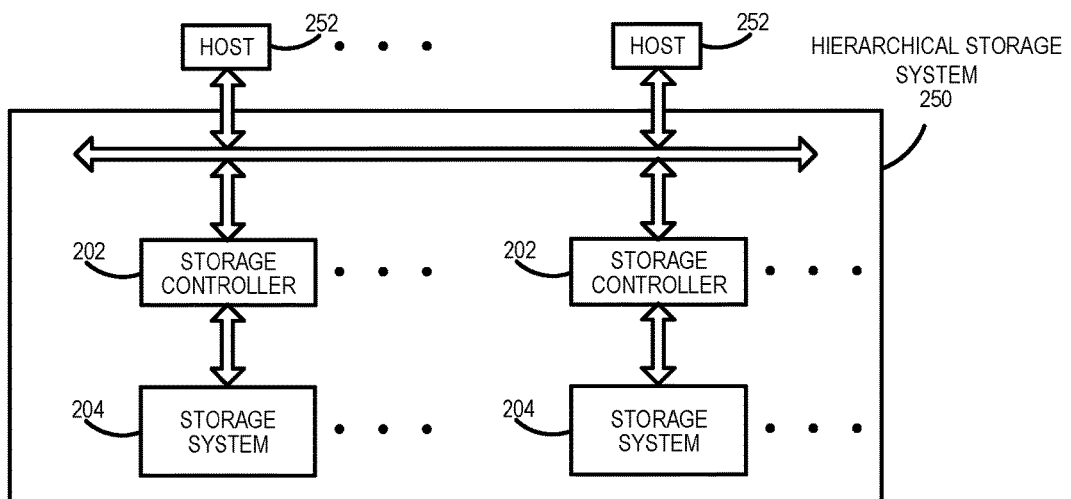
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
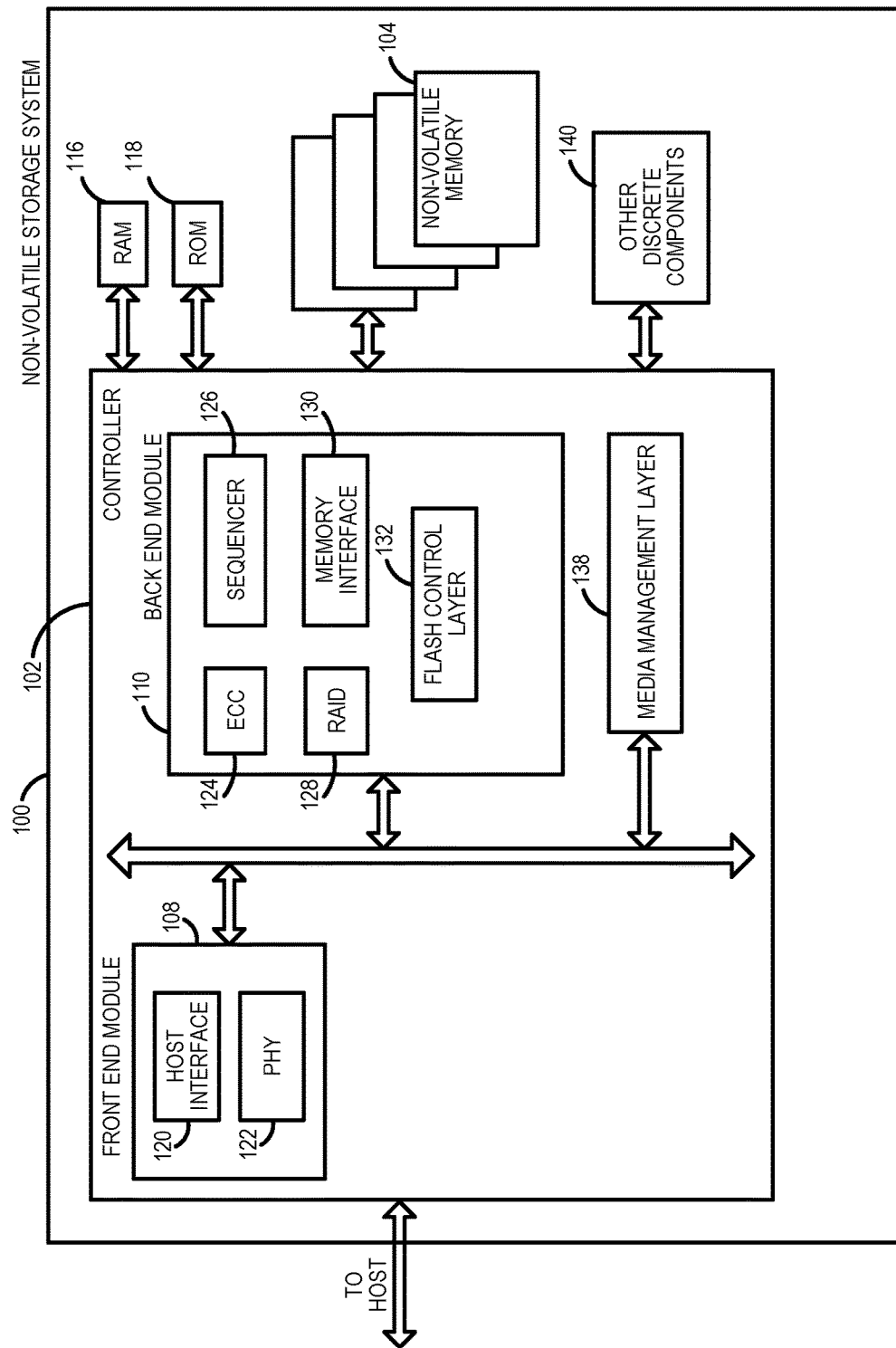
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
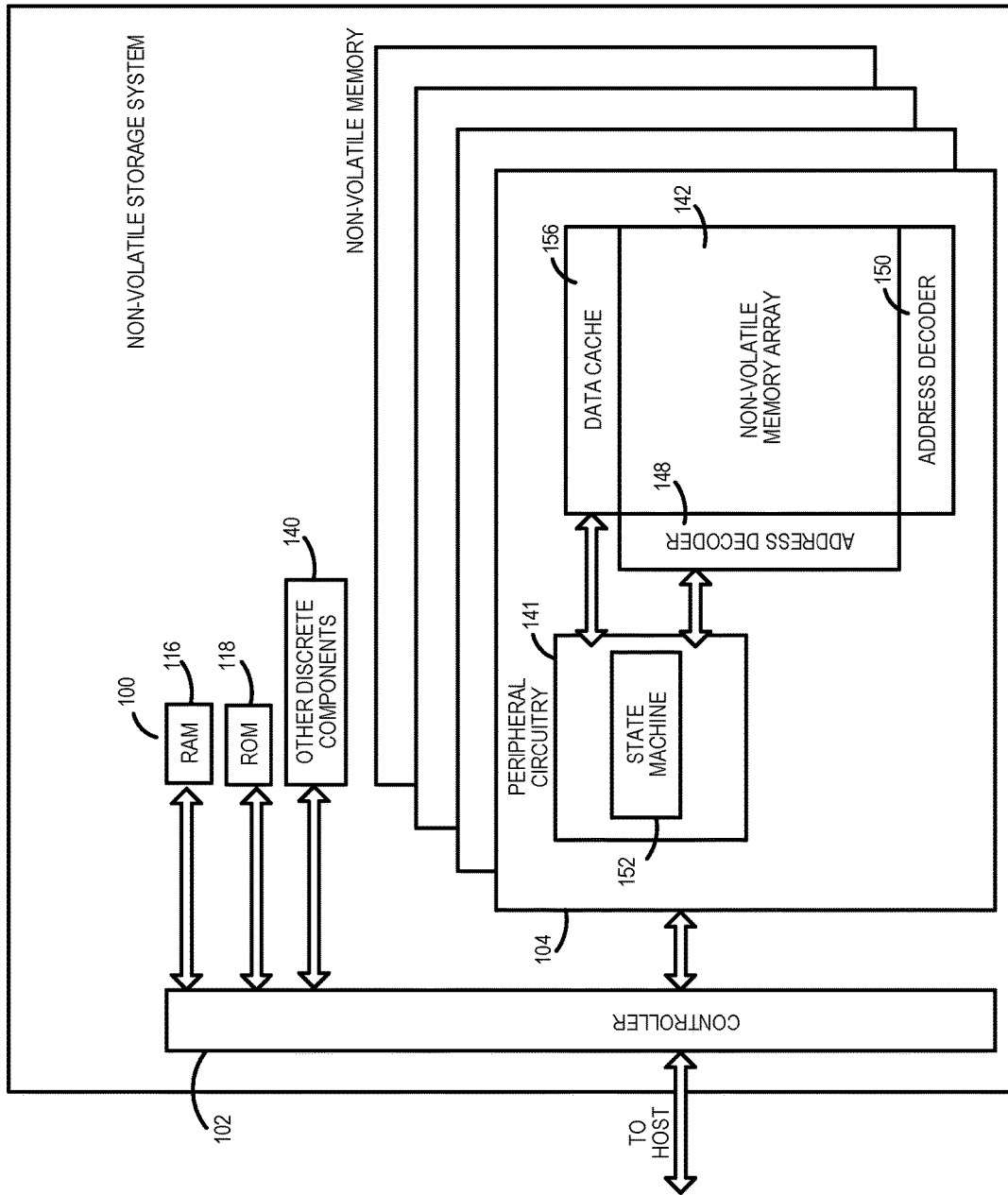
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
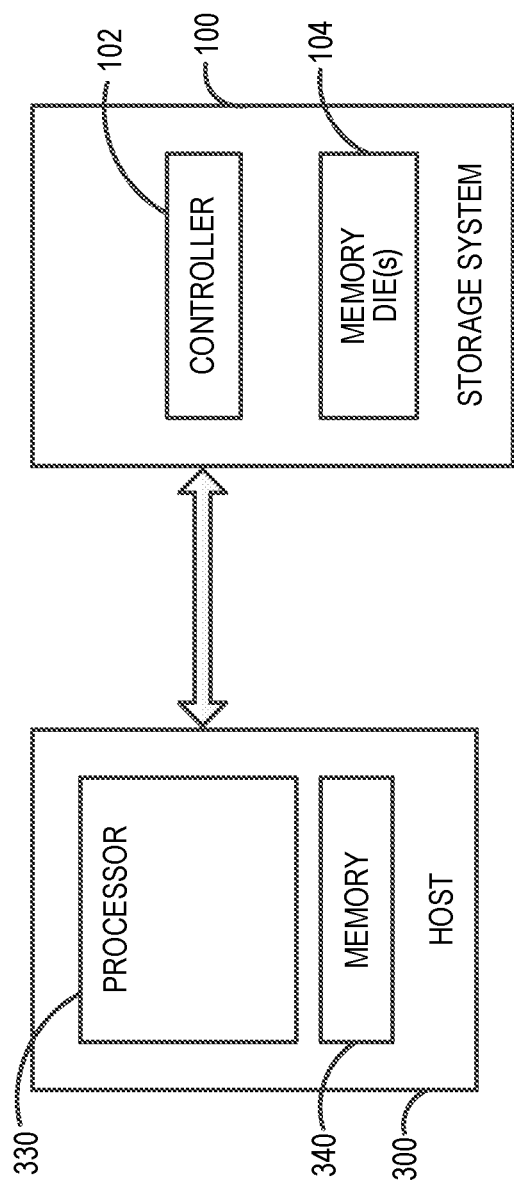
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In general, NAND technology is adopting X4 very fast and moving towards X5 and beyond. Newer NAND is able to pack a relatively-large amount of data but is prone to a greater number of bit errors. Hence, various protection schemes, such as enhanced post-write reads (EPWR) on all data, have been adopted in some data storage devices. In low-grade memories, these soft errors (e.g., block screening failure before folding and EPWR failures) are not rare. The frequency of these soft errors can be especially high after memory blocks have been cycled many times (e.g., mid-life and end-of-life).

Further, each generation of NAND memory is scaling in terms of number of wordlines and number of planes. This is increasing block size and reducing the number of blocks in memory. For example, one terabyte (TB) of a BiCS5 memory die may have about 2,000 blocks, but BiCS6 has only 1,000 blocks. The reduced number of blocks and a greater number of failure protection schemes alongside soft failures has increased situations in which the data storage device has to handle a lot of internal data movement in an urgent manner.

Additionally, many host protocols specify a worst-case delay that it can tolerate in the form of command timeout. For example, the USB protocol has a five-second timeout, which means that, for program operations, the data storage device has to consume the host write within five seconds; otherwise, the host would consider this as a command failure due to device behavior.

Some of the host applications/data can be more critical than others. The delay beyond a threshold can impact performance of a critical application, or, worse, it can stall the full system (e.g., host command completion can be more important than administration commands, such as log read). Similarly, some of applications can be performing some other critical work. This behavior combined with the newer NAND trends, which has increased chances of the host getting throttled by a large magnitude and frequently, can have an adverse impact on overall worst-case performance.

Most of X4 and X5 platforms are folding-based, with single-level cell (SLC) blocks being used as intermediate storage, and folding product performance is typically less than say X3 performance. In addition to lower sustained performance in X4, due to NAND properties, worst case performance of X4 products can be very low compared to X3. Further, in folding-based products where all host data first gets written to SLC blocks, in case of soft errors, there is a chance of losing capacity in SLC blocks if host writes are allowed at faster rate during such situations. This is because host data needs SLC blocks, and internal operations would free up SLC blocks. So, prioritizing host operations over internal operations can lead to a situation where there is no SLC space left to write data. In other words, the data storage device can perform internal operations (e.g., bit-error-rate (BER) scans, data movement, EPWRs, etc.) to free up space and only allow host writes.

The following embodiments can be used to address the problems in the situations mentioned above. For example, these embodiments can attempt to delay the consumption of host commands to the absolute last moment (e.g., just good enough to avoid command timeout), so that the data storage device can recover from these situations and avoid the risk of the data storage device going to read-only mode (i.e., if there are no SLC blocks free, the data storage device cannot write data). In another embodiment, the data storage device can identify command priority and attempt to give higher performance to high-priority commands even in this type of critical situation.

In general, with these embodiments, the data storage device can detect situations where host operations need to be stalled for performing some critical device internal operations. In these situations, various types of commands may be pending to be written. Instead of consuming data at predefined fixed logical points, the controller 102 in the data storage device 100 can trace how long a given command has been pending in a queue in the data storage device 100 and consume the command just before the command is about to timeout (e.g., to give enough time for the data storage device to recover and still avoid command time out). Additionally, the data storage device 100 can attempt to prioritize a few commands over others and try to ensure that critical operations encounter higher performance even in a critical path.

In one example implementation, the controller 102 of the data storage device 100 performs various types of operations alongside host data writes. For example, in a folding platform, a typical sequence can be: the host data is written to SLC blocks, SLC EPWR is performed, block screening is performed before folding by performing BER/BES checks on SLC blocks, SLC blocks are folded to QLC blocks, QLC EPWR is performed, EPWR failures on SLC are handled, EPWR failures on QLC are handled, and internal data movement is performed. Here, only SLC writes are consuming host data, and all other remaining operations are device internal operations.

Each of above stages can take different amount of time (e.g., QLC EPWR can take one second). Some of the steps are dynamic and cannot be predicted (e.g., EPWR failures). Data storage devices can try to consume host data at various predefined points uniformly spread across time, so that the timeout can be avoided. However, a data storage device cannot consume too much host data frequently. If host data is consumed too fast during various points, the data storage device has the risk of running out of free blocks, specifically SLC blocks in a folding platform. Also, there is a dynamic factor involved, as the data storage device may encounter multiple failures (e.g., EPWR failures in low-grade NAND memory are not very infrequent). Workload and a uniform factor might not help.

If a data storage device can attempt to consume pending data at various logical points, problems can be encountered. For example, two logical points where host data is consumed can be far apart (e.g., the data storage device consumes some host data in a prescreening step and some after EPWR). As mentioned above, fixed logical point data consumption may not be able to handle dynamic situations where more errors occur. As another example, where few of the pending commands can be more critical than others, existing methods may not attempt to prioritize them.

In one embodiment, the controller 102 can take action to avoid the data storage device 100 from going into a read-only mode. More specifically, instead of consuming host data at predefined, fixed logical points, the controller 102 can instead consume data based on how long a command has been pending in the data storage device 100. (If a host protocol defines a command timeout, the controller 102 can consume the command before the timeout). This gives the maximum amount of time for the data storage device 100 to recover from critical situations without timing out. In another embodiment, the controller 102 can prioritize some pending commands overs others based on criteria, such as, but not limited to, device type, partition, queue priority, and command type.

In general, with these embodiments, the controller 102 of the data storage device 100 can attempt to give higher performance for critical commands even if the data storage device 100 is in a critical situation. These embodiments can also adapt the performance of those commands dynamically to ensure that best possible performance without risking the data storage device 100 from going into a read-only mode.

As mentioned above, in one embodiment, the controller 102 of the data storage device 100 does not consume data at predefined fixed points but rather from how long each command is pending within the data storage device 100. This information can be tracked in any suitable way, such as by starting a timer or maintaining a counter regarding how many operations were issued within the data storage device 100 since a given command was received. Timer expiry is a logical point at which the controller 102 consumes data. In some cases where the controller 102 determines that the consumption of data is not possible, the controller 102 can override the worst-case performance (WCP) time request. This ensures the data storage device 100 can still perform more-critical internal operation while not timing out on a host command.

Figure 4A:
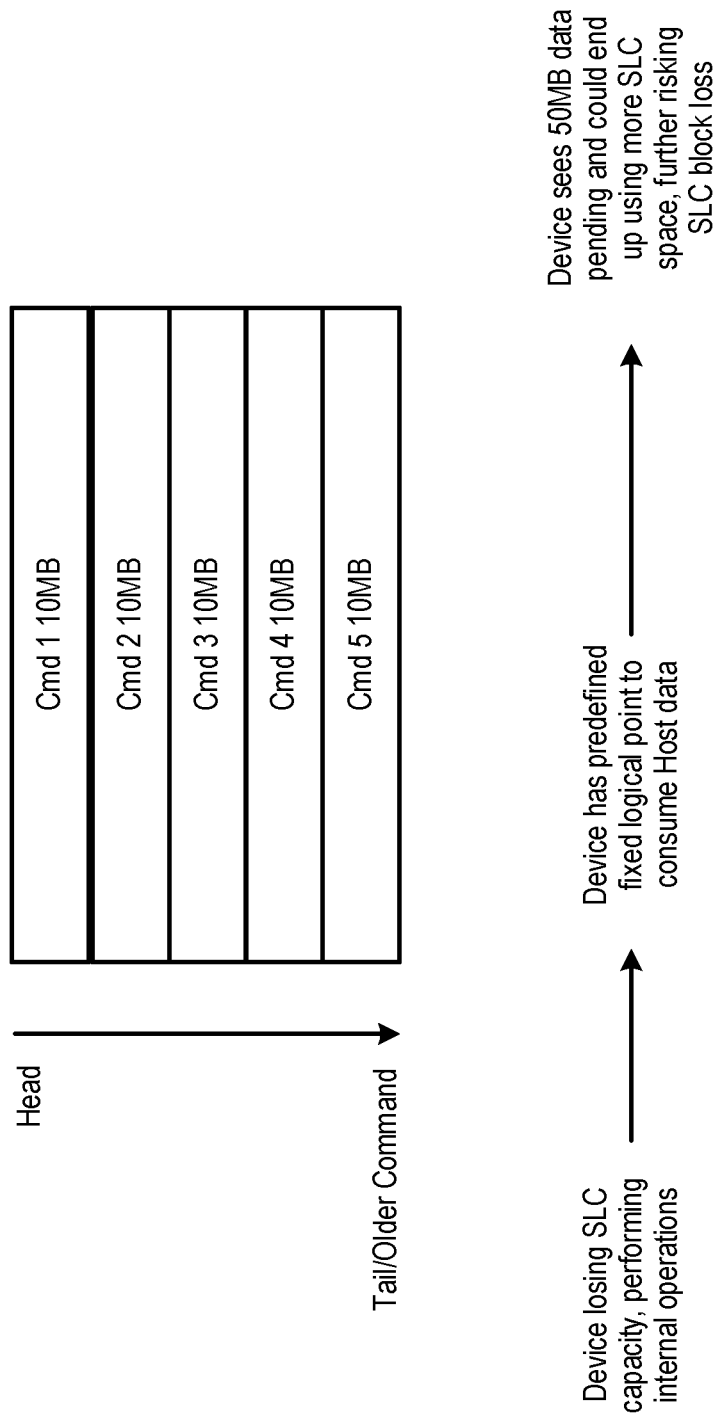
FIGS. 4A and 4B are diagrams that illustrate command execution techniques of embodiments.
Figure 4B:
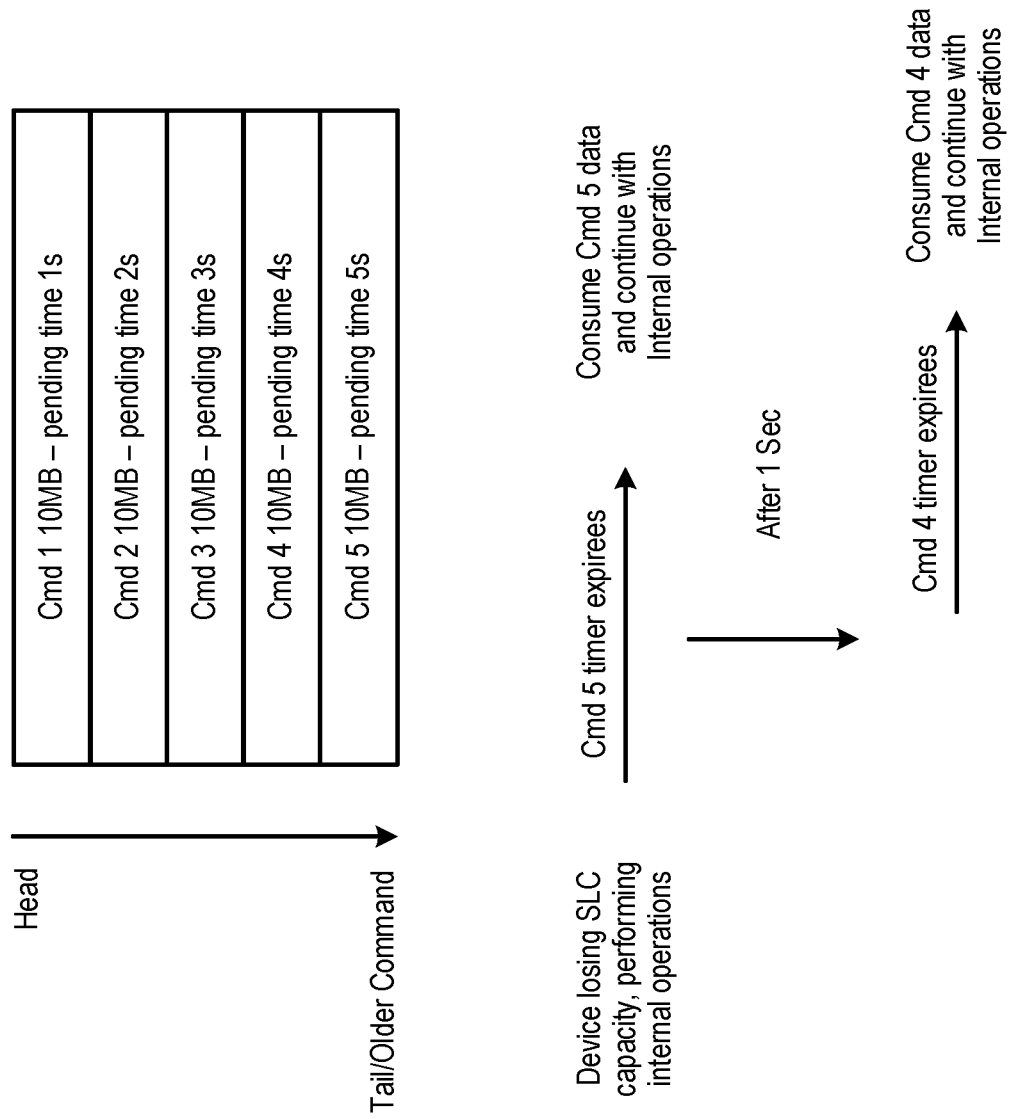

FIGS. 4A and 4B are diagrams that illustrate various data consumption techniques. As shown by a comparison of these diagram, with the embodiment in FIG. 4B, data consumption is scattered and delayed while avoiding the command timeout. This delay of consuming data to the last possible stage gives enough time for the controller 102 to perform internal operations to make more SLC blocks available (e.g., through folding and/or garbage collection) and recover from the critical state.

As mentioned above, in another embodiment, the controller 102 of the data storage device 100 prioritizes a subset of one or more commands over other commands to help ensure that some commands (e.g., critical commands) get better performance than other commands. This embodiment can be used in addition to the previously-described embodiment of not consuming data at fixed points. As mentioned above, the commands can be prioritized in any suitable way, such as by device type. To illustrate this example, consider a streaming device whose primary use case is to store video data (in addition to other operations). In a streaming device, during critical situations, pending sequential commands (e.g., video commands) are prioritized over others. If the command protocol timer is five seconds, the controller 102 can set the timer for one second for sequential commands (i.e., each sequential command would complete in one second). The same timer can be dynamically adjusted. So, in the case that SLC pool capacity remains in a sustained state, the timer can continue to one second, but if SLC capacity is decreasing, the timer can be increased to two second, for example.

Figure 5:
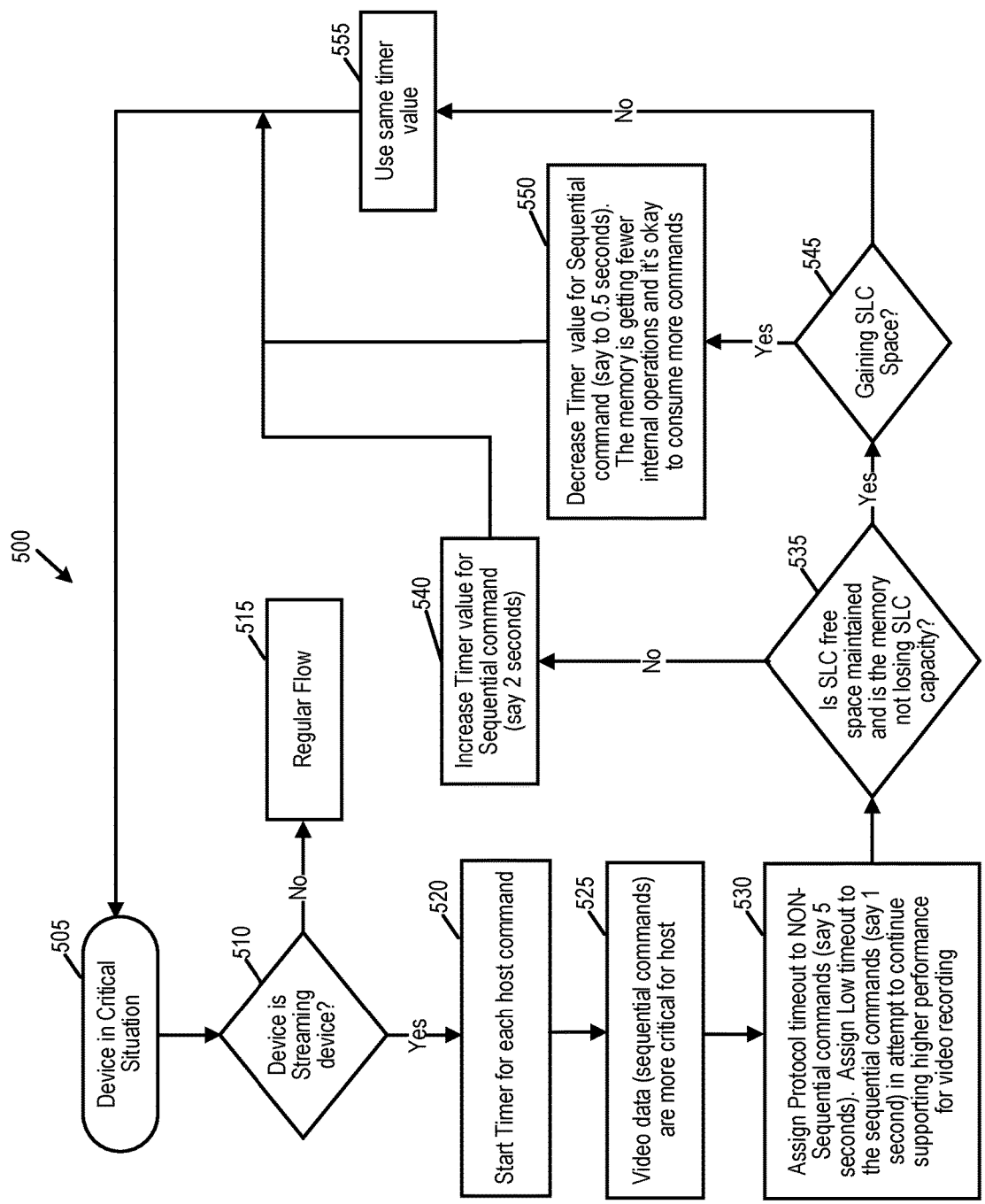
FIG. 5 is a flow chart of a method of an embodiment for delaying execution of a host write command to perform an internal memory operation.

FIG. 5 is a flow chart 500 of a method of an embodiment for application-specific variable worst-case program performance. As shown in FIG. 5, the data storage device 100 is in a critical situation (505), and the controller 102 determines if the data storage device 100 is a streaming device, such as a camera card (510). If the data storage device 100 is not a streaming device, the controller 102 proceeds with a regular flow (515). However, if the data storage device 100 is a streaming device, the controller 102 starts a timer for each host command (525). Since the data storage device 100 is a streaming device, video data (sequential commands) are more critical for the host 300 (525). So, the controller 102 assigns a protocol timeout (e.g., five seconds) to non-sequential commands and assigns a low timeout (e.g., one second) to sequential commands in an attempt to continue supporting higher performance for video recordings (530).

Next, the controller 102 checks if the SLC free space is maintained and if the memory 104 is not losing SLC capacity (535). If that's not the case, the controller 102 increases the timer value (e.g., to two seconds) for sequential commands (540). Otherwise, the controller 102 determines if the memory 104 is gaining SLC space (545). If the memory 104 is gaining SLC space, the controller 102 decreases the timer value (e.g., to 0.5 seconds) for sequential commands (550). This means that the memory 104 is getting fewer internal operations and that it is ok to consume more commands. However, if the memory 104 is not gaining SLC space, the controller 102 decreases the timer value (e.g., to 0.5 seconds) for sequential commands (550), and the same timer value is used (555).

Figure 6:
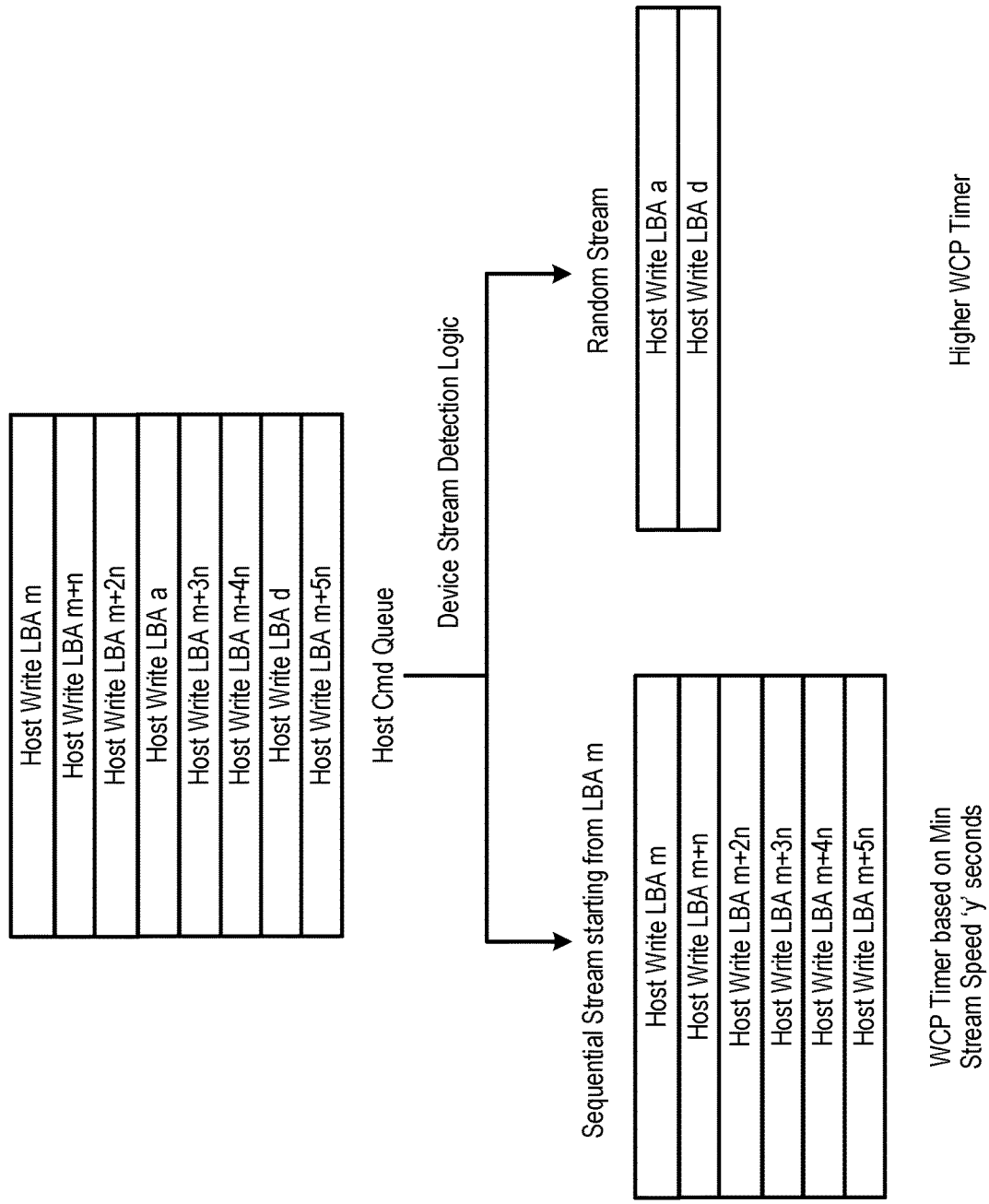
FIG. 6 is a diagram that illustrates an embodiment that prioritizes a certain command type.

As noted above, other prioritization factors can be used. For example, FIG. 6 is a diagram the illustrates how a stream data storage device (e.g., a camera card) can prioritize sequential streams ensuring that a minimum stream speed is honored. In this example, "Host Write LBA a" and "Host Write LBA d" would be delayed. If the protocol timeout limit is five seconds, for example, these commands would be picked just before the five-second command timer expiry. At same time, other sequential commands can be picked faster by the controller 102.

Figure 7:
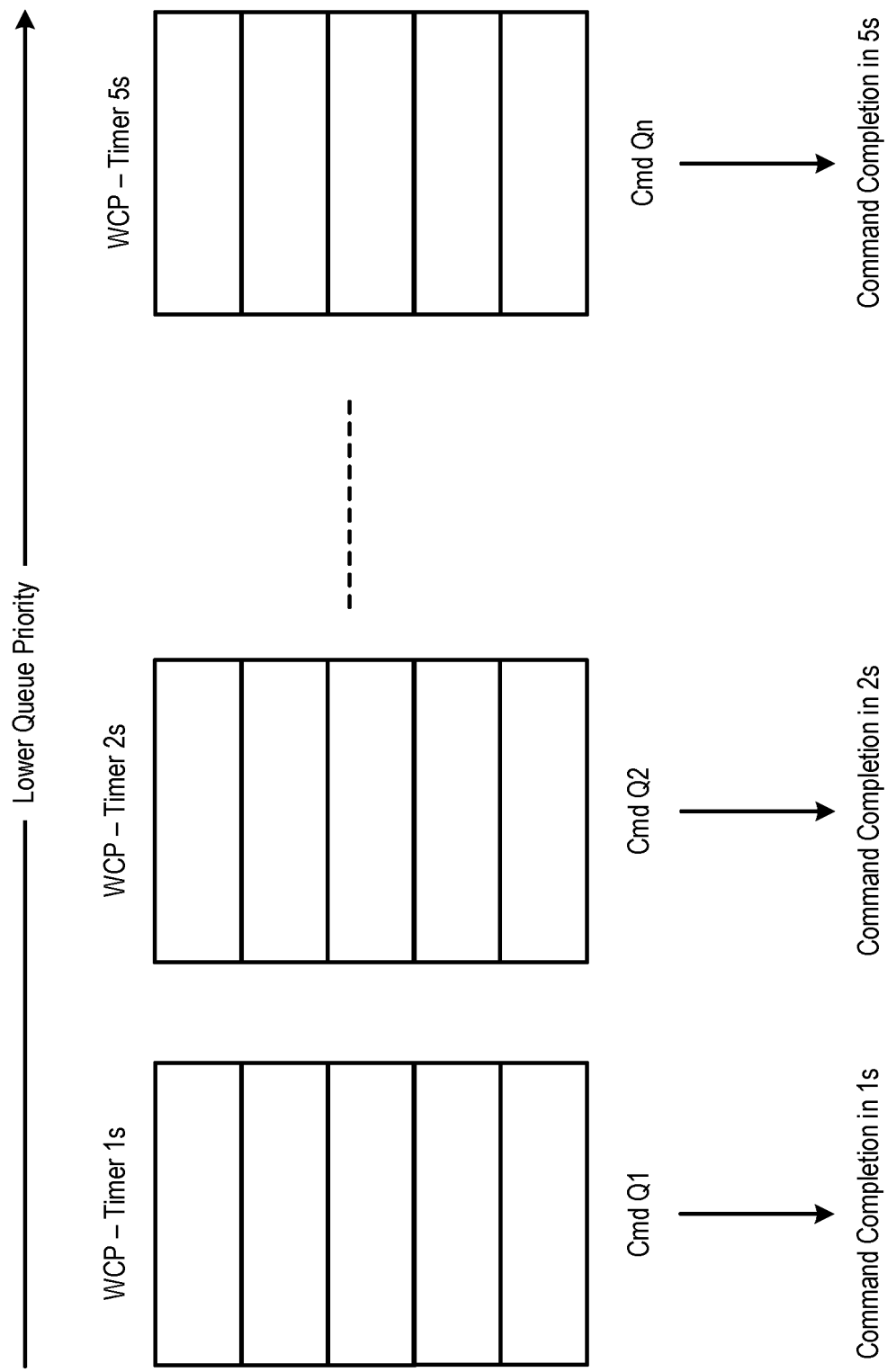
FIG. 7 is a diagram that illustrates an embodiment that prioritizes different queues.

Device partition type is another example of a prioritization factor. Some data storage devices support enhanced partitions and regular user partitions. Enhanced partitions can be used to store operating system data. In this example, a command associated with the enhanced partition can be prioritized over regular user commands. Yet another example of a prioritization factor is queue type. Some data storage devices support queues of different priority. In this case, a higher-priority queue can be assigned a lower timeout value than lower-priority queue. This is illustrated in FIG. 7. Further, another prioritization example is command type. The data storage device 100 can support admin commands (e.g., smart log read, smart log write) alongside host commands. In this case, host commands can be prioritized over admin commands by assigning a shorter command timer to host commands.

There are many advantages associated with these embodiments. For example, these embodiments can be used to provide a methodology where an important (e.g., critical) application on the host can get predictable worst-case performance. This can help ensure consumption of newer (e.g., X4/X5) NAND memories in a multi-application environment. The newer NANDs (e.g., X4/X5) can store more data but are slower and also have a greater chance of exhibiting low performance. This can cause hindrance of adoption of such memories where critical applications get stalled frequently. These embodiments can help consume such memories. These embodiments can also provide a general improvement in the host. Host performance does not solely depend on high performance in normal cases. Certain critical applications can have less tolerance to worst-case performance compared to others. These embodiments can help provide a mechanism for the host to improve overall quality of service. Further, in non-worst-case-performance environments, these embodiments can help reduce the risk of the memory losing SLC capacity. Additionally, these embodiments can reduce the risk of the data storage device entering a read-only mode due to lack of available SLC memory for a write command.

These embodiments may be have a particular advantage in data storage devices that use a folding architecture because of its consistent, internal data movement, where data initially enters SLC blocks before being transferred to MLC blocks. In such data storage devices, the availability of free space in the SLC blocks can become important. However, it should be noted that these embodiments can also be used in other architectures, such as, for example, direct write architectures where data can be written directly to MLC blocks (e.g., X3/X4).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
 a memory comprising single-level cell (SLC) blocks and multi-level cell (MLC) blocks; and
 a processor configured to communicate with the memory and further configured to:
  store, in a queue, a plurality of sequential write commands and a non-sequential write command received from a host, wherein each sequential write command of the plurality of sequential write commands is associated with a timeout window and execution of the plurality of sequential write commands consumes available SLC blocks in the memory, and wherein the timeout window is smaller than a timeout window for the non-sequential write command;
  determine how long each of the plurality of sequential write commands has been pending in the queue; and
  for each sequential write command of the plurality of sequential write commands, delay execution of the sequential write command within the sequential write command's timeout window until the sequential write command has been pending in the queue for a specified amount of time, wherein delaying execution of each sequential write command of the plurality of sequential write commands provides the processor with time to perform a memory operation to increase an amount of available SLC blocks in the memory.

2. The data storage device of claim 1, wherein the processor is further configured to dynamically vary the specified amount of time based on a current amount of available SLC blocks in the memory.

3. The data storage device of claim 1, wherein the processor is further configured to prioritize at least one sequential write command of the plurality of sequential write commands over another sequential write command of the plurality of sequential write commands based on a prioritization factor.

4. The data storage device of claim 3, wherein the prioritization factor comprises a device type.

5. The data storage device of claim 3, wherein the prioritization factor comprises a partition type.

6. The data storage device of claim 3, wherein the prioritization factor comprises a queue type.

7. The data storage device of claim 3, wherein the prioritization factor 7, comprises a command type.

8. The data storage device of claim 1, wherein the processor is further configured to use a timer to determine how long each sequential write command of the plurality of sequential write commands has been pending in the queue.

9. The data storage device of claim 1, wherein the processor is further configured to determine how long each sequential write command of the plurality of sequential write commands has been pending in the queue by maintaining a counter of how many operations were issued within the data storage device since each sequential write command of the plurality of sequential write commands was received.

10. The data storage device of claim 1, wherein the memory comprises a three-dimensional memory.

11. A method comprising:
 performing in a data storage device comprising a memory:
  storing, in a queue, a plurality of sequential write commands and a non-sequential write command received from a host, wherein each sequential write command of the plurality of sequential write commands is associated with a duration limit, and wherein the duration limit is less than a duration limit for the non-sequential write command;
  determining how long each of the plurality of sequential write commands has been pending in the queue; and
  for each sequential write command of the plurality of sequential write commands, delaying execution of the sequential write command within the sequential write command's duration limit until the sequential write command has been pending in the queue for a threshold amount of time.

12. The method of claim 11, further comprising dynamically changing the threshold amount of time based on an available amount of single-level cell (SLC) blocks in the memory.

13. The method of claim 11, further comprising prioritizing at least one sequential write command of the plurality of sequential write commands over another sequential write command of the plurality of sequential write commands based on a prioritization factor.

14. The method of claim 13, wherein the prioritization factor comprises a device type.

15. The method of claim 13, wherein the prioritization factor comprises a partition type.

16. The method of claim 13, wherein the prioritization factor comprises a queue type.

17. The method of claim 13, wherein the prioritization factor comprises a command type.

18. The method of claim 11, further comprising using a timer to determine how long each sequential write command of the plurality of sequential write commands has been pending in the queue.

19. The method of claim 11, further comprising determining how long each sequential write command of the plurality of sequential write commands has been pending in the queue by maintaining a counter of how many operations were issued within the data storage device since each sequential write command of the plurality of sequential write commands was received.

20. A data storage device comprising:
 a memory;
 means for storing, in a queue, a plurality of sequential write commands and a non-sequential write command received from a host, wherein each sequential write command of the plurality of sequential write commands is associated with a timeout window, and wherein the timeout window is smaller than a timeout window for the non-sequential write command;
 means for delaying execution of each sequential write command of the plurality of sequential write commands within the sequential write command's timeout window until the sequential write command has been pending in the queue for a specified amount of time.

* * * * *